United States Patent
Jen

(10) Patent No.: US 7,940,331 B2
(45) Date of Patent: *May 10, 2011

(54) EDGE ADAPTIVE DE-INTERLACING APPARATUS AND METHOD THEREOF

(75) Inventor: Scott Jen, Hsinchu (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 1205 days.

This patent is subject to a terminal disclaimer.

(21) Appl. No.: 11/602,314

(22) Filed: Nov. 21, 2006

(65) Prior Publication Data

US 2007/0177055 A1  Aug. 2, 2007

(30) Foreign Application Priority Data

Jan. 27, 2006  (TW) .............................. 95103568 A

(51) Int. Cl.
*H04N 7/01* (2006.01)
*H04N 11/20* (2006.01)
*H04N 5/21* (2006.01)
*G06K 9/48* (2006.01)

(52) U.S. Cl. ......... 348/448; 348/452; 348/625; 382/199

(58) Field of Classification Search .................. 348/441, 348/448, 452; 382/199
See application file for complete search history.

(56) References Cited

U.S. PATENT DOCUMENTS

| | | | |
|---|---|---|---|
| 5,661,525 A * | 8/1997 | Kovacevic et al. | 348/452 |
| 6,118,488 A * | 9/2000 | Huang | 348/452 |
| 6,415,410 B1 | 7/2002 | Kanerva et al. | |
| 6,421,090 B1 * | 7/2002 | Jiang et al. | 348/452 |
| 6,614,484 B1 * | 9/2003 | Lim et al. | 348/448 |
| 7,023,487 B1 * | 4/2006 | Adams | 348/448 |
| 7,075,580 B2 * | 7/2006 | Jiang | 348/448 |
| 7,126,643 B2 * | 10/2006 | Song et al. | 348/448 |
| 7,161,602 B2 * | 1/2007 | Shan | 345/606 |
| 7,218,354 B2 * | 5/2007 | Tanaka | 348/448 |
| 7,259,794 B2 * | 8/2007 | Chang et al. | 348/452 |
| 7,339,626 B2 * | 3/2008 | Jiang et al. | 348/448 |
| 7,362,376 B2 * | 4/2008 | Winger et al. | 348/448 |
| 7,362,378 B2 * | 4/2008 | Orlick | 348/452 |
| 7,379,625 B2 * | 5/2008 | Wang et al. | 382/300 |
| 7,397,973 B2 * | 7/2008 | Lee | 382/300 |
| 7,489,361 B2 * | 2/2009 | Matsuzaki et al. | 348/458 |
| 7,554,559 B2 * | 6/2009 | Lu et al. | 345/606 |
| 7,567,294 B2 * | 7/2009 | Lu et al. | 348/452 |
| 7,590,307 B2 * | 9/2009 | Wang et al. | 382/300 |
| 7,659,939 B2 * | 2/2010 | Winger et al. | 348/448 |
| 7,667,773 B2 * | 2/2010 | Han | 348/452 |

(Continued)

FOREIGN PATENT DOCUMENTS

CN  1581931 A  2/2005

(Continued)

*Primary Examiner* — Brian Yenke
(74) *Attorney, Agent, or Firm* — Rabin & Berdo, PC

(57) ABSTRACT

An edge adaptive de-interlacing apparatus and method are disclosed. The edge adaptive de-interlacing apparatus includes a complexity detection module, a qualifier, a comparator and a mixer. The complexity detection module detects complexity associated with a target pixel. The qualifier is coupled to the complexity detection module for generating similarity of at least one possible edge angle in response to the complexity. The comparator is coupled to the qualifier for comparing the similarity of the at least one possible edge to select a preferred edge angle. The mixer is coupled to the comparator for generating pixel data of the target pixel according to the preferred edge angle.

23 Claims, 7 Drawing Sheets

U.S. PATENT DOCUMENTS

| | | | |
|---|---|---|---|
| 7,796,191 B1* | 9/2010 | Vojkovich | 348/448 |
| 2003/0112369 A1* | 6/2003 | Yoo et al. | 348/448 |
| 2004/0114833 A1* | 6/2004 | Jiang | 382/300 |
| 2004/0119884 A1* | 6/2004 | Jiang | 348/448 |
| 2005/0122426 A1* | 6/2005 | Winger et al. | 348/452 |
| 2005/0270417 A1* | 12/2005 | Jiang et al. | 348/448 |
| 2007/0070244 A1* | 3/2007 | Wyman et al. | 348/448 |
| 2007/0171302 A1* | 7/2007 | Fazzini | 348/448 |

FOREIGN PATENT DOCUMENTS

| | | |
|---|---|---|
| CN | 1681313 A | 10/2005 |
| TW | I224425 | 11/2004 |

* cited by examiner

EDGE ADAPTIVE DE-INTERLACING APPARATUS AND METHOD THEREOF

This application claims the benefit of Taiwan application Serial No. 95103568, filed Jan. 27, 2006, the subject matter of which is incorporated herein by reference.

BACKGROUND OF THE INVENTION

1. Field of the Invention

The invention relates in general to an edge adaptive de-interlacing apparatus and associated method, and more particularly to an edge adaptive de-interlacing apparatus and method, which can accurately obtain an edge angle by detecting extreme values or complexity of a region surrounding a target pixel.

2. Description of the Related Art

Conventional TV programs are transmitted and displayed in an interlaced way. Take television as an example, and in a process of displaying a frame, it displays an odd field and an even field alternatively. The odd field is composed of odd numbers of display lines in the frame while the even field is composed of even numbers of display lines in the frame.

The refresh rate of a television is normally 30 Hz, that is, 30 frames per second are displayed. Each frame is divided into an odd field and an even field for display. Therefore, there are 60 fields in one second for display.

Owing that progressive display has a higher quality than the interlaced display, an advanced display apparatus can perform de-interlacing display, such as a high definition TV (HDTV).

If the interlaced fields are to be displayed in a de-interlacing way, the interlaced fields should be de-interlaced first and then displayed in complete frames. There are two de-interlacing method. The first method is to merge the adjacent odd field and even field into a complete frame. This kind of method easily causes a saw-tooth effect on a moving picture, thereby influencing a frame quality.

The second de-interlacing method is to interpolate the missing display lines in the odd field or even field. The above-mentioned missing display lines are generated by respectively interpolating for each target pixel by using two vertical adjacent display lines in the same field.

When interpolating a missing line in the same field, a target pixel in that display line is used as a center to find out every possible edge angle and then an edge angle is selected. Finally, a color value of the target pixel is interpolated according to the selected edge angle.

However, the quality of the frame generated by interpolating display lines is determined by whether the selected edge angle is correct. Selecting a wrong edge angle will result in interpolating incorrect color values for the target pixel and bad interpolated image quality.

SUMMARY OF THE INVENTION

The invention provides an edge adaptive de-interlacing apparatus and method thereof. By detecting extreme values or complexity of two adjacent display lines, a preferred edge angle can be found and proper pixel data can be interpolated in between the above two display lines to avoid frame distortion due to selection of an incorrect edge angle.

According to a first aspect of the present invention, an edge adaptive de-interlacing apparatus for de-interlacing a target pixel including a complexity detection module, a qualifier, a comparator and a mixer is provided. The complexity detection module detects complexity associated with the target pixel. The qualifier is coupled to the complexity detection module for generating similarity of at least one possible edge angle in response to the complexity. The comparator is coupled to the qualifier for selecting a preferred edge angle according to the similarity of the at least one possible edge. The mixer is coupled to the comparator for generating pixel data of the target pixel according to the preferred edge angle.

According to a second aspect of the present invention, an edge adaptive de-interlacing method for de-interlacing a target pixel is provided. The method includes detecting complexity associated with the target pixel; generating similarity of at least one possible edge angle in response to the complexity; selecting a preferred edge angle according to the at least one possible edge angle; and generating pixel data of the target pixel according to the preferred edge angle.

According to a third aspect of the present invention, an edge adaptive de-interlacing method for de-interlacing a target pixel is provided. The method includes detecting complexity associated with the target pixel; performing an adaptive edge detection according to the complexity to determine a preferred edge angle; and de-interlacing pixel data of the target pixel according to the preferred edge angle.

According to a fourth aspect of the present invention, an edge adaptive de-interlacing apparatus for de-interlacing a target pixel including an extreme-value detection module, a qualifier, a comparator, and a mixer is provided. The extreme-value detection module is for detecting at least an extreme-value position of a luminance distribution curve in a first region related to the target pixel and accordingly outputting a prediction signal for indicating a predicted angle region. The qualifier is coupled to the extreme-value detection module for generating similarity of at least one possible edge angle in response to the predicted angle region. The comparator is coupled to the qualifier for selecting a preferred edge angle according to the similarity of the at least one possible edge angle. The mixer is coupled to the comparator for generating pixel data of the target pixel according to the preferred edge angle.

According to a fifth aspect of the present invention, an edge adaptive de-interlacing method for de-interlacing a target pixel is provided. The method includes detecting at least an extreme-value position of the field surrounding the target pixel and accordingly outputting a prediction signal for indicating a predicted angle region; generating similarity of at least one possible edge angle in response to the predicted angle region; selecting a preferred edge angle according to the similarity of the at least one possible edge angle; and generating pixel data of the target pixel according to the preferred edge angle.

The invention will become apparent from the following detailed description of the preferred but non-limiting embodiments. The following description is made with reference to the accompanying drawings.

DETAILED DESCRIPTION OF THE INVENTION

The de-interlacing apparatus transforms an interlaced image into a de-interlacing image for output such that a preferred edge angle can be obtained for accordingly interpolating the absent display lines correctly in an odd field or even field. In the embodiment, by detecting complexity of, for example, a first display line and a second display line located adjacently the to-be-interpolated display line, the correct edge angle can be found out for providing a delicate image frame.

Figure 1:
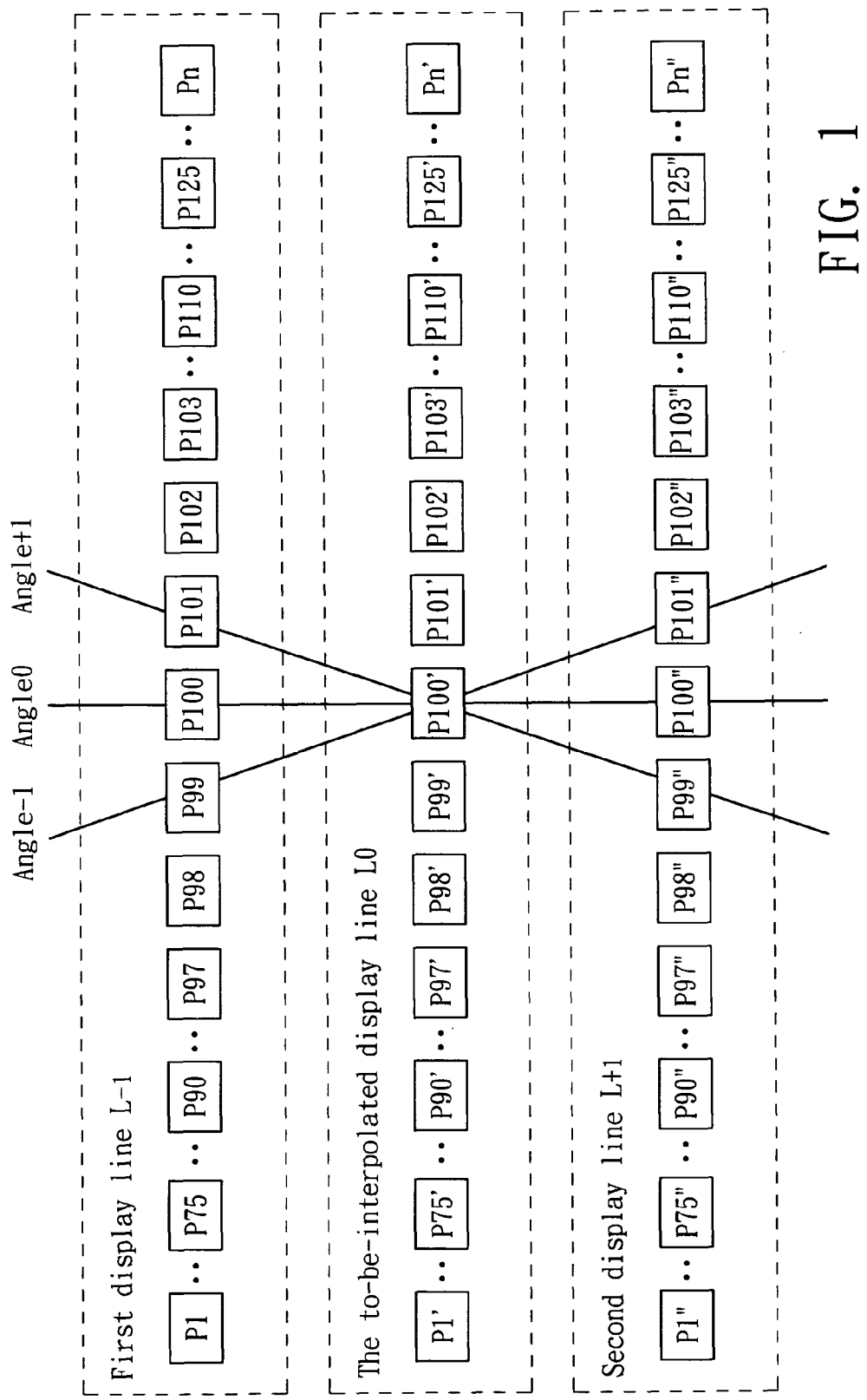
FIG. 1 is a schematic diagram of a first display line, a second display line and a pixel of a to-be-interpolated display line.

Referring to FIG. 1, a schematic diagram of a first display line, a second display line and a to-be-interpolated display line associated with a target pixel is shown. The first display line $L_{-1}$ includes pixels P1~Pn, the to-be-interpolated display line $L_0$ includes pixels P1'~Pn', and the second display line $L_{+1}$ includes pixels P1"~Pn".

When interpolating a target pixel of the to-be-interpolated display line $L_0$ between the first display line $L_{-1}$ and the second display line $L_{+1}$, the de-interlacing apparatus selects a part of pixels of the first display line $L_{-1}$ and the second display line $L_{+1}$ related to the target pixel according to extreme values or complexity of luminance distribution curves of the first display line $L_{-1}$ and the second display line $L_{+1}$.

Possible edge angles are represented between the selected part of pixels and the target pixel. The de-interlacing apparatus finds out a preferred edge angle from all the possible edge angles to interpolate proper pixel data, such as grey values, for the target pixel.

For example, when interpolating pixel data of the target pixel P100' of the to-be-interpolated display line $L_0$, the de-interlacing apparatus selects pixels P81~P119 of the first display line $L_{-1}$ and pixels P81"~P119" of the second display line $L_{+1}$ symmetrically to the target pixel P100' according to extreme values or complexity of the first display line $L_{-1}$ and the second display line $L_{+1}$. A plurality of possible edge angles are represented by the target pixel P100', the pixels P81~P119 and the pixels P81"~P119". For example, the pixels P100 and P100" and the target pixels P100' represent a possible edge angle Angle0, the pixel P99 and P101" and the target pixel P100' represent a possible edge angle Angle-1, and the pixels P101 and P99" and the target pixel P100' represent a possible edge angle Angle+1. It can be analogized that the pixels P81-P119 and P81"~P119" and the target pixel P100' form 39 possible edge angles. The de-interlacing apparatus then finds out a preferred edge angle from the 39 possible edge angles and interpolates proper pixel data according to the preferred edge angle.

Embodiment One

Figure 2:
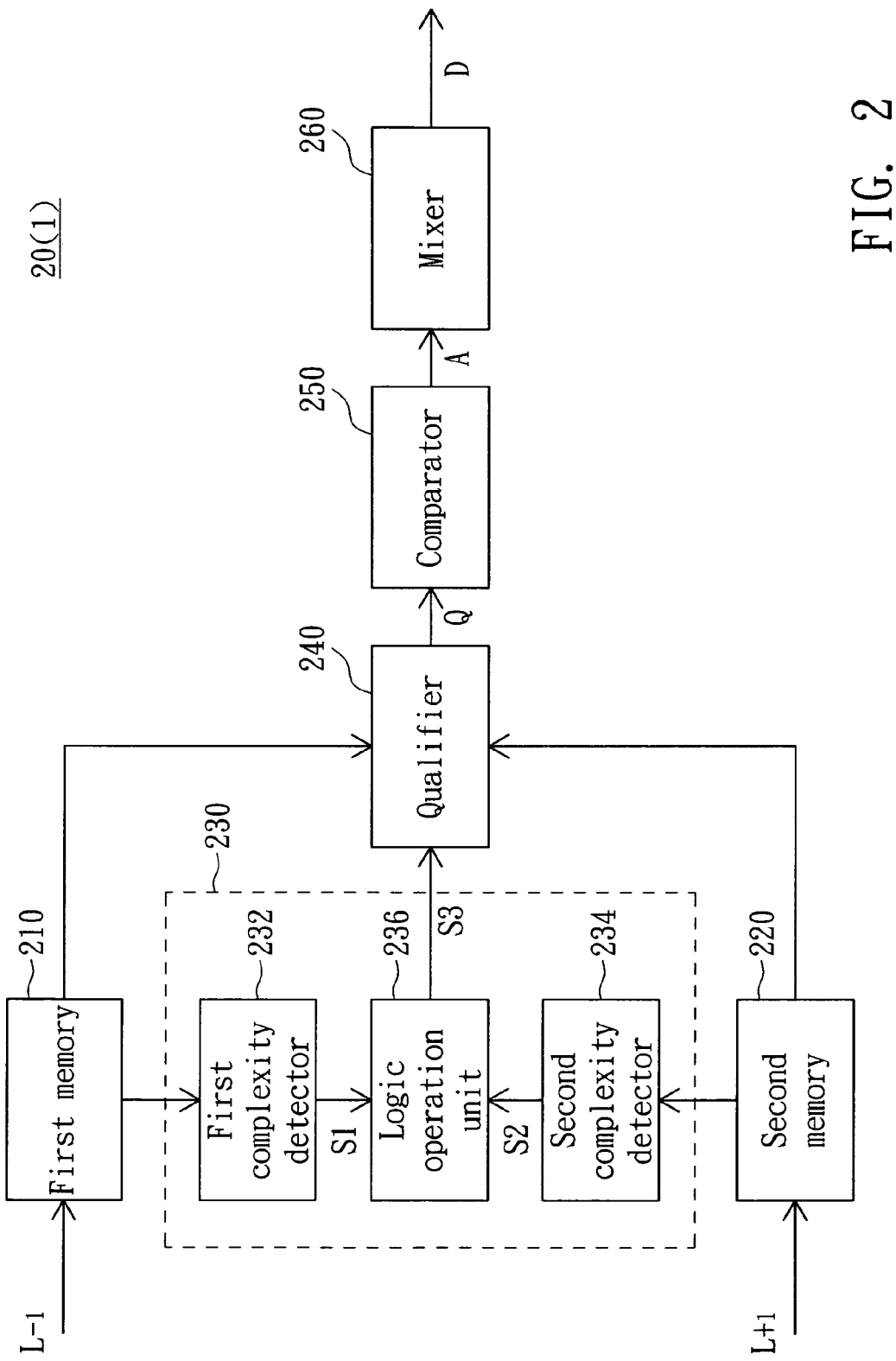
FIG. 2 is a block diagram of a de-interlacing apparatus according to a first embodiment of the invention.

Referring to FIG. 2, a block diagram of a de-interlacing apparatus according to a first embodiment of the invention is shown. A de-interlacing apparatus 20(1) includes a first memory 210, a second memory 220, a complexity detection module 230, a qualifier 240, a comparator 250 and a mixer 260. The complexity detection module 230 includes a first complexity detector 232, a second complexity detector 234 and a logic operation unit 236. The first memory 210 stores the above first display line $L_{-1}$ and the second memory 220 stores the above second display line $L_{+1}$ (as shown in FIG. 1).

The first complexity detector 232 detects a first complexity of the first display line $L_{-1}$ in a first region corresponding to the target pixel. Pixel data of the pixels in the first region can be represented by a luminance distribution curve with reference to their pixel positions. The first complexity detector 232 outputs a first determination signal S1 according to complexity of the distribution curve of the first display line $L_{-1}$. For example, the first determination signal S1 includes a plurality of first flags for indicating whether complexity of the first display line $L_{-1}$ in the first region exceeds a threshold value. For example, complexity of a predetermined region can be determined by the amount of extreme values in that region. When images in the region have a lot of extreme values, it represents brightness of images in that region varies very severely and image complexity is high, and otherwise, image complexity is low.

Similarly, the second complexity detector 234 detects a second complexity of the second display line $L_{+1}$ in a first region corresponding to the target pixel. Relationship of pixel data of pixels in the first region relative to their pixel positions can be represented by a luminance distribution curve. The second complexity detector 234 outputs a second determination signal S2 according to complexity of the luminance distribution curve of the second display line $L_{+1}$. For example, the second determination signal S2 includes a plurality of second flags for indicating whether complexity of the second display line $L_{+1}$ in the first region exceeds a threshold value.

The first determination signal S1 and the second determination signal S2 are respectively output to the logic operation unit 236. The logic operation unit 236 performs a logic operation, such as a logic OR operation or a logic AND operation, according to the first determination signal S1 and the second determination signal S2 and outputs a control signal S3 for indicating a second region to the qualifier 234 after the logic operation. Preferably, if the logic operation unit 236 performs the logic OR operation, it determines the luminance distribution is complicated when at least one of complexity of the luminance distribution curves of the first display line $L_{-1}$ and the second display line $L_{+1}$ exceeds the threshold value. Alternatively, if the logic operation is a logic AND operation, it determines the luminance distribution is complicated only when complexity of the luminance distribution curves of the first display line $L_{-1}$ and the second display line $L_{+1}$ both exceeds the threshold value. Thus, the proper second region is determined accordingly.

The qualifier 240 receives the control signal S3 and generates similarity Q of possible edge angles of pixel pairs of the first display line $L_{-1}$ and the second display line $L_{+1}$ in the second region. For example, the similarity Q quantizes probability of every possible edge angle to become a preferred edge angle, which can be determined by, for example, whether there exist determined angles in the same direction among the neighboring pixels.

The comparator 250 receives the similarity Q outputted by the qualifier 249 and compares the similarity Q of each possible edge angle for selecting a preferred edge angle A accordingly. The mixer 260 interpolates pixel data D for the target pixel according to the preferred edge angle. For example, the mixer 260 obtains an average value or a weighting average of pixel data of the pixels on the preferred edge angel A.

Figure 3:
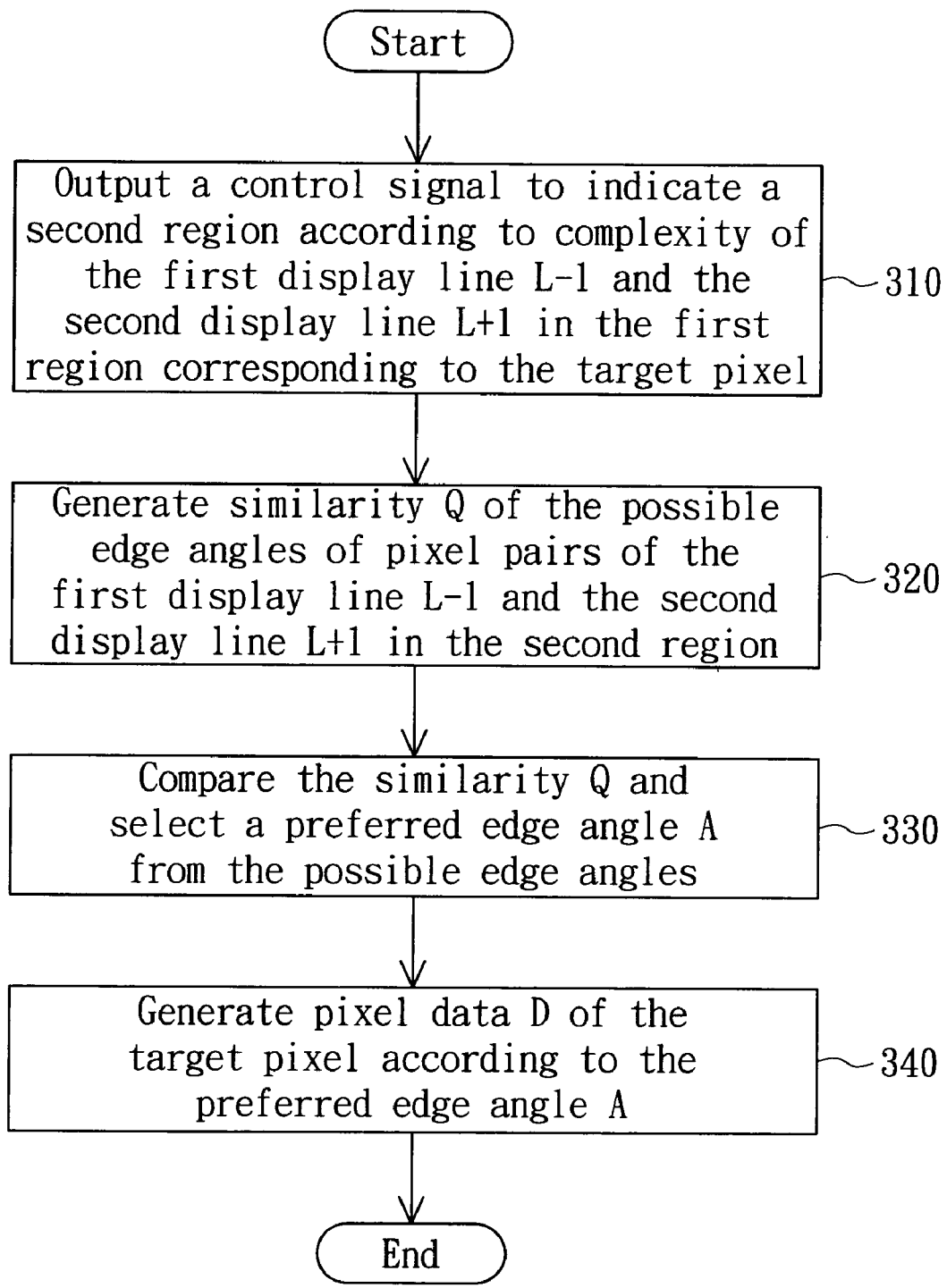
FIG. 3 is a flow chart of a de-interlacing method applied to the de-interlacing apparatus in FIG. 2 according to an embodiment of the invention.

Referring to FIG. 3, a flow chart of a de-interlacing method applied to the above de-interlacing apparatus 20(1) according to an embodiment of the invention is shown. First, in step 310, the complexity detection module 230 outputs the control signal S3 for indicating the second region according to complexity of luminance distribution curves of the first display line $L_{-1}$ and the second display line $L_{+1}$ in the first region corresponding to the target pixel.

Next, in step 320, the qualifier 240 receives the control signal S3, and generates the similarity Q of the possible edge angles of pixel pairs of the first display line $L_{-1}$ and the second display line $L_{+1}$ in the second region. In step 330, the comparator 250 compares the similarity Q and selects the preferred edge angle A from the possible edge angles. Finally, in step 340, the mixer 260 generates the pixel data D of the target pixel according to the preferred edge angle A.

For example, when the frame contains characters for display, its complexity is higher. Contrarily, when the frame shows pictures, its complexity is lower. Therefore, when the de-interlacing apparatus 20(1) is to interpolate pixel data of the target pixel P100' of the to-be-interpolated display line $L_0$ (as shown in FIG. 1), the complexity detection module 230 outputs the control signal S3 according to complexity of the luminance distribution curves of the first display line $L_{-1}$ and the second display line $L_{+1}$ in the first region corresponding to the target pixel P100'. For example, the pixels in the first region of the first display line $L_{-1}$ are pixels P75~P125, and the pixels in the first region of the second display line $L_{+1}$ are pixel P75"~P125".

Preferably, when complexity of the luminance distribution curves of the pixels P75~P125 and P75"~P125" is smaller than a threshold value, the de-interlacing apparatus 20(1) selects a larger second region and the pixels in the larger second region of the first display line $L_{-1}$ are pixels P90~P110 and the pixels in the larger second region of the second display line $L_{+1}$ are pixels P90"~P110" for instance.

Preferably, when complexity is larger than a threshold value, the de-interlacing apparatus 20(1) selects a smaller second region to avoid a wrong determination of a preferred edge angle. The pixels in the smaller second region of the first display line $L_{-1}$ are pixels P95~P105 and the pixels in the smaller second region of the second display line $L_{+1}$ are pixels P95"~P105" for instance.

In this way, when the complexity is high, the de-interlacing apparatus 20(1) finds out the preferred edge angle from the smaller second region and interpolates proper pixel data according to the preferred edge angle to avoid a wrong selection of the preferred edge angle due to usage of an overlarge region. For example, as processing pixels, a window can define a processing region. The sizes of the window and the above region are associated with a predetermined number of the display lines to be considered in the surrounding. In this embodiment, the first display line $L_{-1}$ and the second display line $L_{+1}$ are taken as an example.

Embodiment Two

Figure 4:
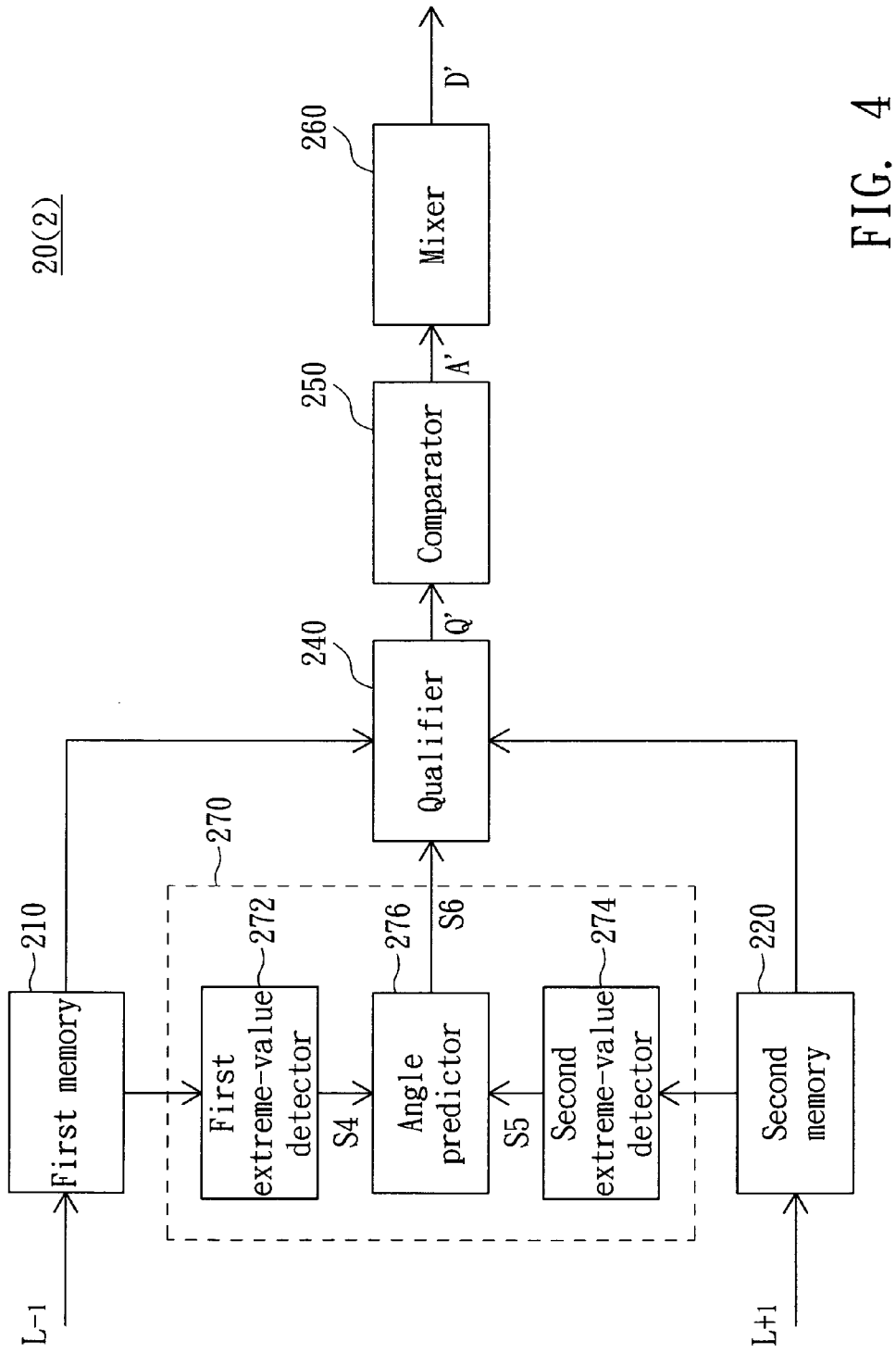
FIG. 4 is a block diagram of a de-interlacing apparatus according to a second embodiment of the invention.

Referring to FIG. 4, a block diagram of a de-interlacing apparatus according to a second embodiment of the invention is shown. In the embodiment, an extreme-value detection module 270 detects extreme values of the first display line $L_{-1}$ and the second display line $L_{+1}$ in a third region corresponding to the target pixel. For example, when each of the luminance distribution curves of the first display line $L_{-1}$ and the second display line $L_{+1}$ in the third region has an extreme value, a prediction signal S6 is outputted for indicating a predicted angle region of possible edge angles. The de-interlacing apparatus 20(2) can thus more accurately find out a preferred edge angle from the predicted angle region for interpolating pixel data.

The extreme-value detection module 270 includes a first extreme-value detector 272, a second extreme-value detector 274 and an angle predictor 276. The first extreme-value predictor 272 detects extreme values of a luminance distribution curve of the first display line $L_{-1}$ in the third region and outputting a first extreme-value signal S4 according to at least one position(s) of the extreme values of the luminance distribution curve. For example, the extreme value of each display line can be determined by using a first-order differential calculation. An extreme value exists where the differential value varies its positive or negative sign, i.e. a change of positive or negative sign in the differential operation.

Similarly, the second extreme-value detector 274 detects extreme values of a luminance distribution curves of the second display line $L_{+1}$ in the third region and outputting a second extreme-value signal S5 according to at least one position(s) of the extreme values of the luminance distribution curve.

When each of the luminance distribution curves of the first display line $L_{-1}$ and the second display line $L_{+1}$ has an extreme value, the angle predictor 276 outputs a prediction signal S6 for indicating a predicted angle region according to the first extreme-value signal S4 and the second extreme-value signal S5.

The qualifier 240 receives the prediction signal S6 and generates similarity Q' of possible edge angles of pixel pairs of the first display line $L_{-1}$ and the second display line $L_{+1}$ corresponding to the predicted angel region.

The comparator 250 receives the similarity Q' outputted by the qualifier 240 and compares the similarity Q' of the possible edge angles to select a preferred edge angle A'. The mixer 260 generates pixel data D' of the target pixel according to the preferred edge angle A'.

Figure 5:
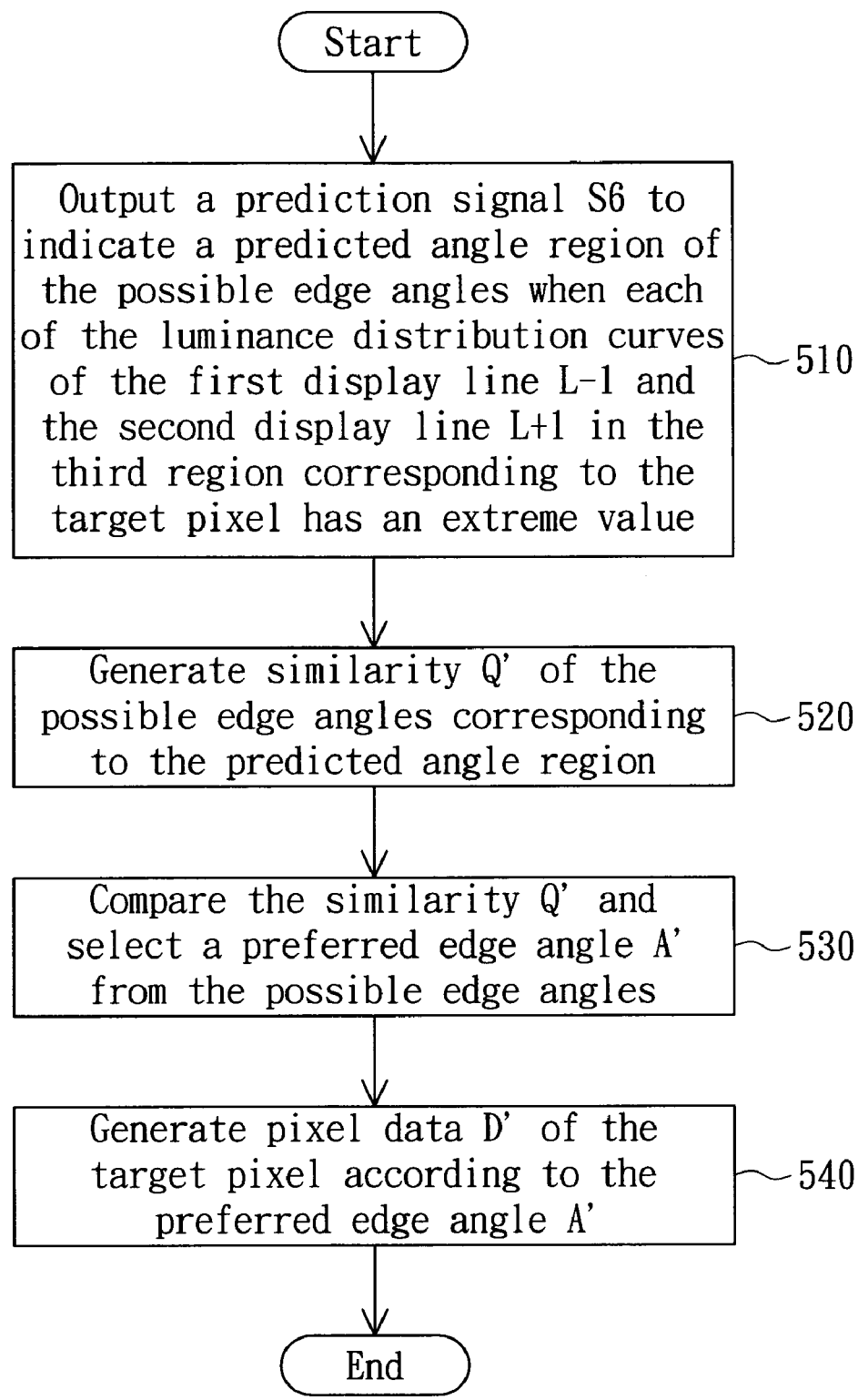
FIG. 5 is a flow chart of a de-interlacing method applied to the above de-interlacing apparatus in FIG. 4 according to a preferred embodiment of the invention.

FIG. 5 shows a flow chart of a de-interlacing method applied to the above de-interlacing apparatus 20(2) according to a preferred embodiment of the invention. First, in step 510, the extreme-value detection module 270 detects the first display line $L_{-1}$ and the second display line $L_{+1}$ in the third region. When each of the luminance distribution curves of the first display line $L_{-1}$ and the second display line $L_{+1}$ in the third region with reference to the target pixel, a prediction signal S6 is outputted to indicate a predicted angle region of the possible edge angles.

Next, in step 520, the qualifier 240 receives the prediction signal S6 and generates the similarity Q' of the possible edge angles corresponding to the predicted angle region. In step 530, the comparator 250 compares the similarity Q' to select the preferred edge angle A' from the possible edge angles. Finally, in step 540, the mixer 260 generates pixel data D' of the target pixel according to the preferred edge angle A'.

For example, when the de-interlacing apparatus 20(2) interpolates pixel data of the target pixel P100' of the to-be-interpolated display line L0 (as shown in FIG. 1), the extreme-value detection module 270 outputs the prediction signal S6 according to the extreme values of the luminance distribution curves of the first display line $L_{-1}$ and the second display line $L_{+1}$ in the third region with reference to the target pixel P100'. The pixels in the third region of the first display line $L_{-1}$ are pixels P75~P125 and the pixels in the third region of the second display line $L_{+1}$ are pixels P75"~P125" for instance. When detecting the extreme values on the pixel P102 of the first display line $L_{-1}$, for example, the first extreme-value detector 272 outputs the first extreme-value signal S4 to the angle predictor 276. Similarly, when detecting out extreme values on the pixel P98" of the second display line $L_{+1}$, for example, the second extreme-value detector 274 outputs the second extreme-value signal S5 to the angle predictor 276. The angle predictor 276 generates the prediction signal S6 to the qualifier 240 for indicating the predicted angle region according to the first extreme-value signal S4 and the second extreme-value signal S5. In this embodiment, the predicted angle region may encompass pixels P101~P103 and P97"~P99". The de-interlacing apparatus 20(2) finds out a preferred edge angle from the possible edge angles represented by the pixels P101~P103 and P97"~P99" and the target pixel P100' in order to interpolate the pixel data according to the preferred edge angle.

Embodiment Three

Figure 6:
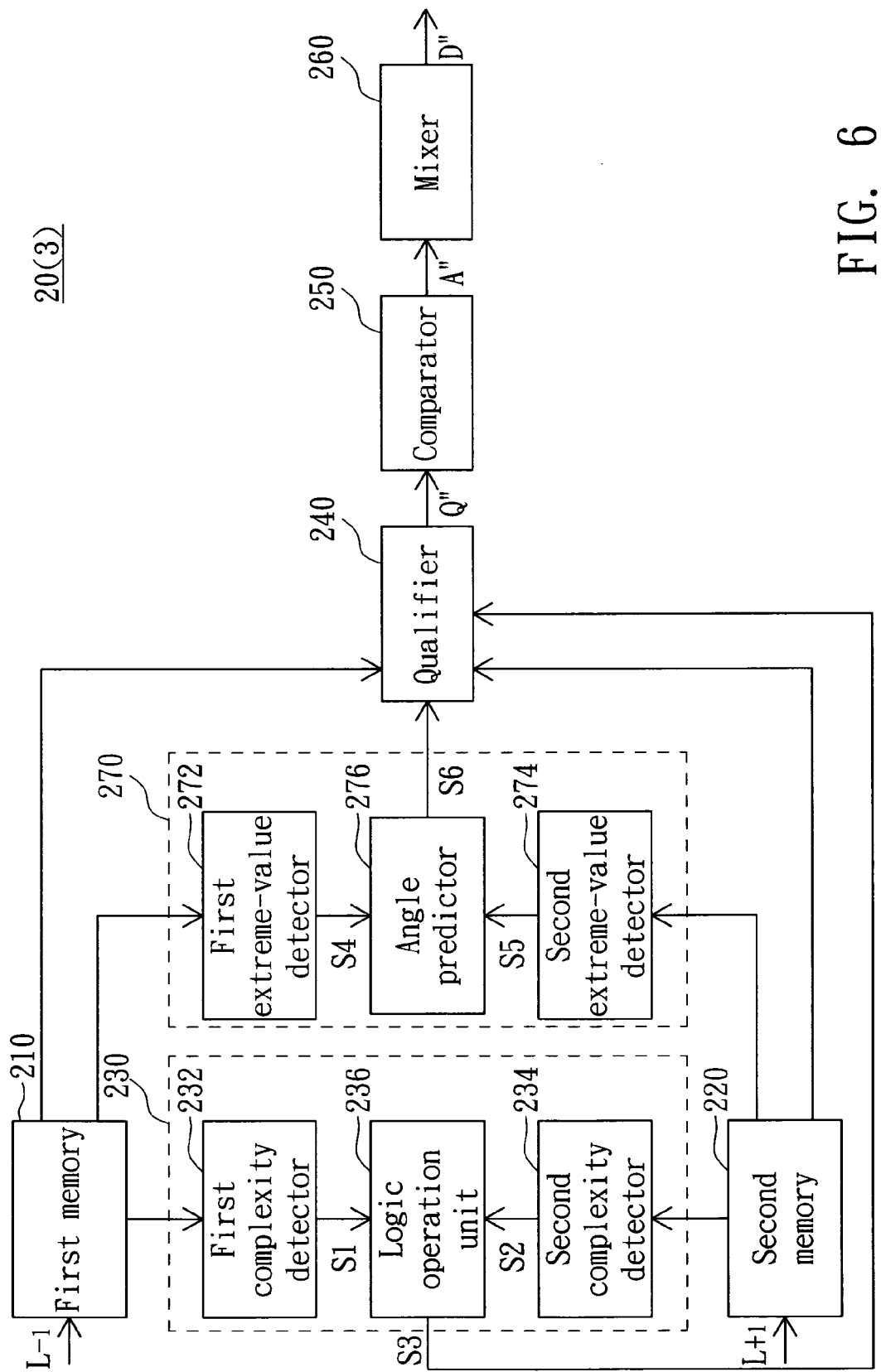
FIG. 6 is a block diagram of a de-interlacing apparatus according to a third embodiment of the invention.

Referring to FIG. 6, a block diagram of a de-interlacing apparatus according to a third embodiment of the invention is shown. A de-interlacing apparatus 20(3) respectively detects extreme values and/or complexity of the first display line $L_{-1}$ and the second display line $L_{+1}$ via the extreme-value detection module 270 and the complexity detection module 230 to accurately find out the preferred edge angle for interpolating proper pixel data.

Figure 7:
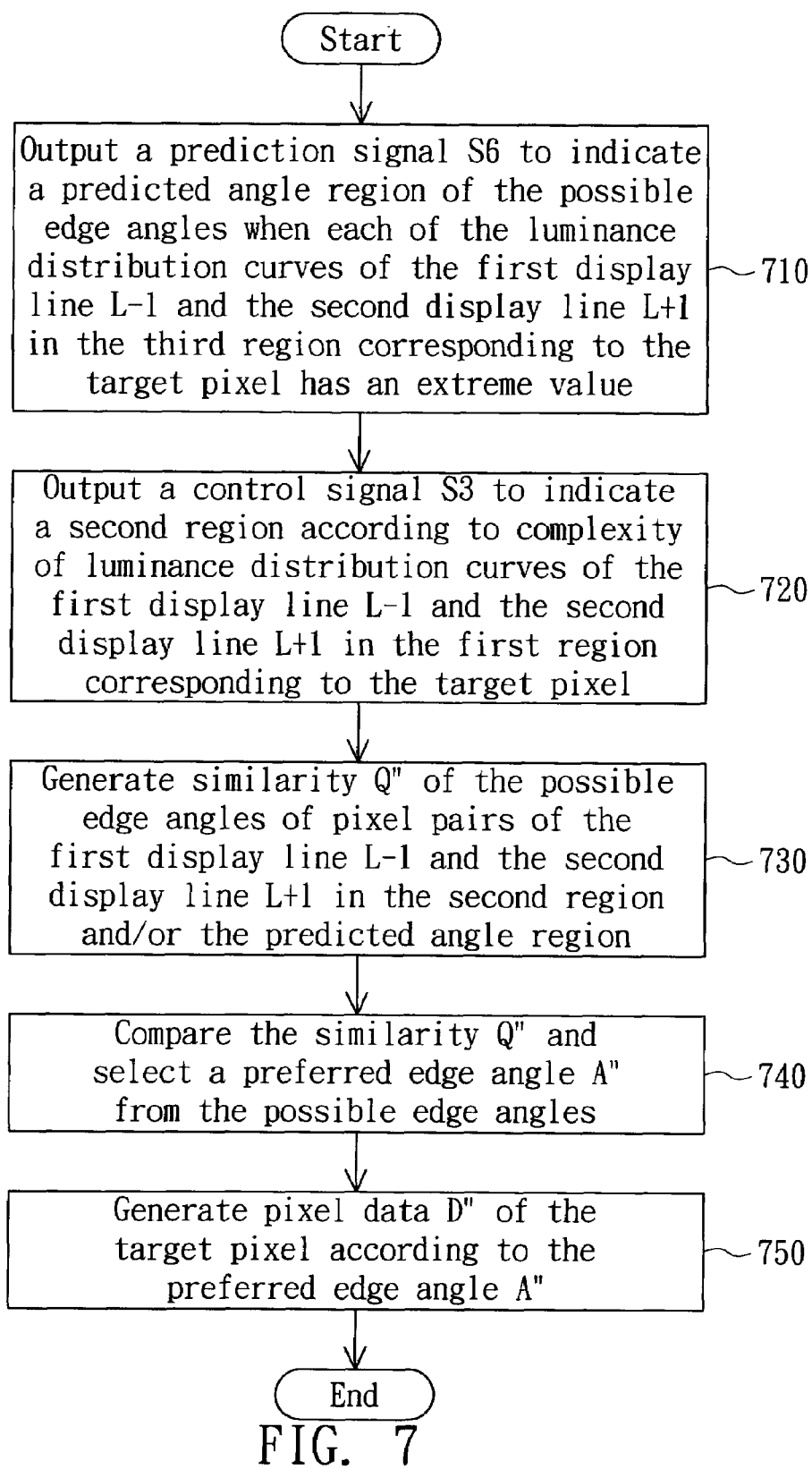
FIG. 7 is a flow chart of a de-interlacing method applied to the de-interlacing apparatus in FIG. 6 according to a preferred embodiment of the invention

FIG. 7 shows a flow chart of a de-interlacing method applied to the above de-interlacing apparatus 20(3) according to a preferred embodiment of the invention. First, in step 710, when each of the luminance distribution curves of the first display line $L_{-1}$ and the second display line $L_{+1}$ has an extreme value within the third region with respect to the target pixel, the extreme-value detection module 270 outputs the prediction signal S6 to indicate a predicted angle region of the possible edge angles.

Next, in step 720, if the luminance distribution curves of the first display line $L_{-1}$ and the second display line $L_{+1}$ in the third region with reference to the target pixel have a plurality of extreme values, the complexity detection module 230 outputs the control signal S3 to indicate a second region according to the complexity of the luminance distribution curves of the first display line $L_{-1}$ and the second display line $L_{+1}$ in the first region with reference to the target pixel. Preferably, in the second region, at least one of the first display line $L_{-1}$ and the second display line $L_{+1}$ has complexity smaller than a threshold value.

In step 730, the qualifier generates similarity Q" of the possible edge angles of pixel pairs of the first display line $L_{-1}$ and the second display line $L_{+1}$ in the second region or the predicted angle region according to the control signal S3 and/or the prediction signal S6.

In step 740, the comparator 250 compares the similarity Q" to select a preferred edge angle A" from the possible edge angles. Finally, in step 750, the mixer 260 generates pixel data D" of the target pixel according to the preferred edge angle A".

For example, when the de-interlacing apparatus 20(3) interpolates pixel data of the target pixel P100' of the to-be-interpolated display line $L_0$ (as shown in FIG. 1), the extreme-value detection module 270 outputs the prediction signal S6 according to the extreme values of the luminance distribution curves of the first display line $L_{-1}$ and the second display line $L_{+1}$ in the third region with reference to the target pixel P100'. The third region of the first display line $L_{-1}$ includes pixels P75~P125 and the third region of the second display line $L_{+1}$ includes pixels P75"~P125" for instance.

Preferably, when each of the luminance distribution curves of the first display line $L_{-1}$ and the second display line $L_{+1}$ in the third region has an extreme value, for example, the extreme-value detection module 270 detects the extreme values from the pixel P102 of the first display line $L_{-1}$ and the pixel P98" of the second display line $L_{+1}$, the extreme-value detection module 270 outputs the prediction signal to indicate a prediction angle region, including the pixels P101~P103 and P97"~P99" for instance.

The qualifier 240 generates the similarity Q" of the possible edge angles represented by the pixels P101~P103 and P97"~P99" and the target pixel P100'. The comparator 250 selects the preferred edge angle A" from the similarity Q" of the possible edge angles and the mixer 260 generates the pixel data D" of the target pixel according to the preferred edge angle A".

On the other hand, when the luminance distribution curves of the first display line $L_{-1}$ and the second display line $L_{+1}$ in the third region have a plurality of extreme values, the complexity detection module 230 outputs the control signal S3 to indicate a second region according to the complexity of the luminance distribution curves of the first display line $L_{-1}$ and the second display line $L_{+1}$ in a first region corresponding to the target pixel. The first region of the first display line $L_{-1}$ includes pixels P75~P125 and the first region of the second display line $L_{+1}$ includes pixels P75"~P125" for instance.

The control signal S3 controls the qualifier 240 to generate the similarity Q" of the possible edge angles of pixel pairs of the first display line $L_{-1}$ and the second display line $L_{+1}$ in the second region. For example, the pixels of the first display line $L_{-1}$ in the second region include pixels P90~P110 and the pixels of the second display line $L_{+1}$ in the second region include pixels P90"~P110". The comparator 250 compares the similarity Q" of the possible edge angles to select the preferred edge angle A". The mixer 260 generates the pixel data D" of the target pixel according to the preferred edge angle A".

As mentioned above, the invention discloses an edge adaptive de-interlacing apparatus for de-interlacing a target pixel including a complexity detection module, a memory module, a qualifier, a comparator and a mixer. The complexity detection module detects complexity surrounding the target pixel in the field and the complexity represents an amount of extreme values existed in a region surrounding the target pixel. The memory module, such as a line buffer of a liquid crystal display (LCD) controller, is coupled to the complexity detection module for storing a plurality of display lines. For example, the memory module includes a first memory for storing a first display line and a second memory for storing a second display line. The qualifier is coupled to the complexity detection module for generating at least one possible edge angle(s) in response to the complexity. The comparator is coupled to the qualifier for selecting the preferred edge angle from the at least one possible edge angle by comparing the at least one possible edge angle(s). The mixer is coupled to the comparator for generating pixel data of the target pixel according to the preferred edge angle. For example, the mixer interpolates the pixel data of the target pixel by using a first display line and a second display line adjacent to the target pixel.

The invention discloses an edge adaptive de-interlacing method for de-interlacing a target pixel. First, detect complexity surrounding the target pixel in the field. Then, perform an adaptive edge detection according to the complexity to determine a preferred edge angle. For example, a window processing region is determined according to the complexity. The higher the complexity is, the smaller the window processing region is chosen. Inversely, the lower the complexity is, the larger the window processing region is chosen. Finally, interpolate the pixel data of the target pixel according to the preferred edge angle.

The edge adaptive de-interlacing apparatus and method disclosed by the above embodiment of the invention can accurately find out the preferred edge angle for providing a delicate image frame by detecting extreme values and/or complexity of the luminance distribution curves of adjacent display lines.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An edge adaptive de-interlacing apparatus for de-interlacing a target pixel, comprising:
    a complexity detection module, for detecting complexity associated with the target pixel, wherein the complexity detection module comprises:
        a first complexity detector, for detecting a first complexity of a luminance distribution curve of a first display line in a first region associated with the target pixel to output a first determination signal;
        a second complexity detector, for detecting a second complexity of a luminance distribution curve of a second display line in the first region to output a second determination signal; and
        a logic operational unit, for performing a logic operation according to the first determination signal and the second determination signal to output a control signal;
    a qualifier, coupled to the complexity detection module, for generating similarity of at least one possible edge angle in response to the control signal;
    a comparator, coupled to the qualifier for comparing said similarity of the at least one possible edge to select a preferred edge angle; and
    a mixer, coupled to the comparator for generating pixel data of the target pixel according to the preferred edge angle.

2. The edge adaptive de-interlacing apparatus according to claim 1, wherein the mixer generates the pixel data of the target pixel by interpolating the first display line and the second display line adjacent to the target pixel.

3. The edge adaptive de-interlacing apparatus according to claim 2, wherein the control signal indicates a second region to the qualifier and the qualifier generates similarity of possible edge angles of pixel pairs of the first display line and the second display line in the second region.

4. The edge adaptive de-interlacing apparatus according to claim 1, further comprising a memory module coupled to the complexity detection module.

5. The edge adaptive de-interlacing apparatus according to claim 4, wherein the memory module is a line buffer.

6. The edge adaptive de-interlacing apparatus according to claim 4, wherein the memory module comprises:
    a first memory, for storing the first display line; and
    a second memory, for storing the second display line.

7. The edge adaptive de-interlacing apparatus according to claim 1, wherein the complexity associated with the target pixel represents an amount of extreme-values existed in the first region.

8. The edge adaptive de-interlacing apparatus according to claim 7, wherein the amount of extreme values existed in the first region is obtained by a differential calculation.

9. The edge adaptive de-interlacing apparatus according to claim 1, wherein the logic operation is a logic OR operation or a logic AND operation.

10. The edge adaptive de-interlacing apparatus according to claim 1, wherein the first determination signal comprises a plurality of first flags for indicating the first complexity of the luminance distribution curve of the first display line.

11. The edge adaptive de-interlacing apparatus according to claim 1, wherein the second determination signal comprises a plurality of second flags for indicating the second complexity of the luminance distribution curve of the second display line.

12. The edge adaptive de-interlacing apparatus according to claim 1, further comprising an extreme-value detection module for detecting positions of extreme values in a third region associated with the target pixel to output a prediction signal for indicating a predicted angle region.

13. The edge adaptive de-interlacing apparatus according to claim 12, wherein the extreme-value detection module outputs the prediction signal to indicate the predicted angle region when each of luminance distribution curves of the first display line and a the second display line in the third region associated with the target pixel has an extreme value.

14. An edge adaptive de-interlacing method for de-interlacing a target pixel, comprising:
    detecting complexity associated with the target pixel, comprising:
        detecting a first complexity of a luminance distribution curve of a first display line in a first region associated with the target pixel to output a first determination signal;
        detecting a second complexity of a luminance distribution curve of a second display line in the first region to output a second determination signal; and
        performing a logic operation according to the first determination signal and the second determination signal to output a control signal;
    generating similarity of at least one possible edge angle in response to the control signal;
    selecting a preferred edge angle according to the at least one possible edge angle; and
    generating pixel data of the target pixel according to the preferred edge angle.

15. The de-interlacing method according to claim 14, wherein the in the step of generating pixel data, the pixel data of the target pixel are generated by interpolating the first display line and the second display line adjacent to the target pixel.

16. The de-interlacing method according to claim 14, wherein the complexity associated with the target pixel represents an amount of extreme-values existed in the first region.

17. The de-interlacing method according to claim 14, wherein the control signal indicates a second region associated with the target pixel.

18. The de-interlacing method according to claim 17, wherein the step of generating similarity of the at least one possible edge angle generates similarity of the at least one possible edge angle of a plurality of pixel pairs of the first display line and the second display line in the second region.

19. The de-interlacing method according to claim 18, wherein the step of selecting the preferred edge angle selects the preferred edge angle by comparing the similarity of the at least one possible edge angle.

20. The de-interlacing method according to claim 14, further comprising an extreme-value detecting step for detecting positions of extreme values in a third region associated with the target pixel to output a prediction signal for indicating a predicted angle region.

21. An edge adaptive de-interlacing method for de-interlacing a target pixel, comprising:
   detecting complexity associated with the target pixel, comprising:
      detecting a first complexity of a luminance distribution curve of a first display line in a first region associated with the target pixel to output a first determination signal;
      detecting a second complexity of a luminance distribution curve of a second display line in the first region to output a second determination signal; and
      performing a logic operation according to the first determination signal and the second determination signal to output a control signal;;
   performing an adaptive edge detection according to the control signal to determine a preferred edge angle; and
   generating pixel data of the target pixel according to the preferred edge angle.

22. The de-interlacing method according to claim 21, wherein in the step of performing an adaptive edge detection, a window processing region is determined according to the control signal.

23. The de-interlacing method according to claim 22, wherein in the step of performing an adaptive edge detection, the higher the complexity associated with the target pixel is, the smaller the window processing region is.

* * * * *